(12) United States Patent
Yoon et al.

(10) Patent No.: US 12,434,777 B2
(45) Date of Patent: Oct. 7, 2025

(54) ACTIVE AIR SKIRT APPARATUS

(71) Applicants: HYUNDAI MOTOR COMPANY, Seoul (KR); KIA CORPORATION, Seoul (KR); HYUNDAI MOBIS CO., LTD., Seoul (KR)

(72) Inventors: Jin Young Yoon, Gimpo-si (KR); Dong Eun Cha, Hwaseong-si (KR); Hong Heui Lee, Suwon-si (KR); Jae Sup Byun, Seongnam-si (KR); Jang Ho Kim, Seoul (KR)

(73) Assignees: HYUNDAI MOTOR COMPANY, Seoul (KR); KIA CORPORATION, Seoul (KR); HYUNDAI MOBIS CO., LTD., Seoul (KR)

( * ) Notice: Subject to any disclaimer, the term of this patent is extended or adjusted under 35 U.S.C. 154(b) by 488 days.

(21) Appl. No.: 18/120,263

(22) Filed: Mar. 10, 2023

(65) Prior Publication Data
US 2024/0132166 A1 Apr. 25, 2024
US 2024/0227954 A9 Jul. 11, 2024

(30) Foreign Application Priority Data

Oct. 19, 2022 (KR) .................. 10-2022-0135007

(51) Int. Cl.
 *B62D 35/00* (2006.01)
 *B62D 35/02* (2006.01)
(52) U.S. Cl.
 CPC ........... *B62D 35/005* (2013.01); *B62D 35/02* (2013.01)
(58) Field of Classification Search
 CPC ...... B62D 35/005; B62D 35/02; B62D 37/02; Y10T 10/82

USPC ........................................... 296/180.1, 180.5
 See application file for complete search history.

(56) References Cited

U.S. PATENT DOCUMENTS

| | | | |
|---|---|---|---|
| 7,780,223 B2 | 8/2010 | Kottenstette et al. | |
| 8,702,152 B1* | 4/2014 | Platto | B62D 37/02 296/180.1 |
| 2010/0140976 A1* | 6/2010 | Browne | B62D 35/005 296/180.1 |
| 2012/0153581 A1* | 6/2012 | Li | B60G 17/0565 296/180.1 |
| 2017/0106922 A1* | 4/2017 | Povinelli | B62D 37/02 |
| 2019/0009831 A1 | 1/2019 | Albertson et al. | |
| 2021/0053482 A1* | 2/2021 | Klop | B60Q 1/0483 |
| 2024/0132166 A1* | 4/2024 | Yoon | B62D 35/00 |
| 2024/0400139 A1* | 12/2024 | Yoon | B62D 35/02 |
| 2024/0409048 A1* | 12/2024 | Byun | B62D 37/02 |
| 2025/0065963 A1* | 2/2025 | Byun | B62D 35/005 |
| 2025/0171093 A1* | 5/2025 | Byun | B62D 37/02 |

FOREIGN PATENT DOCUMENTS

| | | |
|---|---|---|
| KR | 2005-0099314 A | 10/2005 |
| KR | 2020-0001850 A | 1/2020 |

* cited by examiner

*Primary Examiner* — Gregory A Blankenship
(74) *Attorney, Agent, or Firm* — MCDONNELL BOEHNEN HULBERT & BERGHOFF LLP

(57) ABSTRACT

An active air skirt apparatus controls an airflow flowing to a lower side of a mobility device according to a traveling state of the mobility device, thereby securing optimal aerodynamic performance. In addition, disclosed herein is an active air skirt apparatus, which stably moves a flap for controlling the airflow when a vehicle travels at high speed, thereby improving durability and reliability.

12 Claims, 11 Drawing Sheets

ACTIVE AIR SKIRT APPARATUS

CROSS REFERENCE TO RELATED APPLICATIONS

The present application claims priority of Korean Patent Application No. 10-2022-0135007 filed on Oct. 19, 2022, the entire contents of which is incorporated herein for all purposes by this reference.

BACKGROUND

Field of the Disclosure

The present disclosure relates to an active air skirt apparatus for improving aerodynamic performance by controlling an airflow flowing through a lower portion of a mobility device.

Description of the Related Art

When vehicles travel at high speed, air in the atmosphere is compressed to generate turbulence, and the generated turbulence causes a problem in that the stability and traveling performance of the vehicles are lowered.

In order to solve this problem, a rear spoiler is installed in the vehicles. The rear spoiler increases pressure that allows the vehicles to move down more stably toward a road surface by adjusting the airflow behind the vehicle, thereby improving traveling stability and traveling performance for the vehicles that travel at high speed.

The rear spoiler is installed on a rear side of the vehicle and there is a limitation in a degree of freedom in design, it is difficult to change a design when the rear spoiler is installed once, and the design is disturbed by the installation of the rear spoiler when the rear spoiler is applied luxury vehicles.

As described above, the rear spoiler is limited as a technology for improving aerodynamic performance in order to improve fuel efficiency and traveling stability of the vehicle, and there is a problem in that a shape of the vehicle or a specification of the rear spoiler needs to be changed to improve additional aerodynamic performance.

Therefore, in recent years, various spoiler devices for controlling the airflow are also provided on a lower portion of the vehicle except for the rear spoiler.

In particular, an air skirt installed on the lower portion of the vehicle and for controlling the airflow has also been developed, but there is a problem in that the air skirt may not consider a traveling situation because it is also maintained in a fixed state, and the air skirt is damaged by hitting the road surface.

The matters explained as the background art are for the purpose of enhancing the understanding of the background of the present disclosure and should not be taken as acknowledging that they correspond to the related art already known to those skilled in the art.

SUMMARY

The present disclosure has been proposed to solve the problems, and is directed to providing an active air skirt apparatus, which secures optimal aerodynamic performance by controlling an airflow flowing through a lower portion of a mobility device according to a traveling state of the mobility device. In addition, the present disclosure is directed to providing an active air skirt apparatus, which improves durability and reliability by stably moving a flap for controlling the airflow even when a vehicle travels at high speed.

An active air skirt apparatus according to the present disclosure for achieving the objects includes a housing vertically formed with a guide part, a flap provided on the guide part and moving vertically along the guide part, a driver installed in the housing and configured to generate power, a driving link rotatably installed in the housing, connected to the driver, and rotating downward upon operation of the driver in a state of being positioned to face upward, and a driven link rotatably connected to the flap, rotatably connected to the driving link, and moving to press the flap down while rotated downward upon rotation of the driving link in a state of being positioned to face forward so that the flap moves along the guide part.

The housing may be installed on a vehicle body on a lower portion of a mobility device, provided inside a bumper cover, and configured to adjust an airflow flowing to a lower side of the mobility device as the flap vertically moves.

The housing may be formed with an upper mounting part mounted on a vehicle body on an upper end thereof, a first lower mounting part mounted on a bumper cover on a front surface of a lower end thereof, and a second lower mounting part mounted on an undercover on a rear surface of the lower end thereof.

The housing may be formed with a support part bent to surround the flap and may move only in a vertical direction in a state in which the flap is inserted into the support part.

The guide part may be formed as a slit hole extending upward from a lower end of the housing, and the flap may be formed with a slider inserted into the guide part and may slide vertically along the guide part.

The housing may be formed with an installation part behind the guide part and one end of the driving link is rotatably mounted on the installation part, the slider may be formed with a hinge part and one end of the driven link is rotatably mounted on the hinge part, and the other end of the driving link and the other end of the driven link may be rotatably connected.

The housing may include a plurality of guide parts and a plurality of installation parts, the flap may include a plurality of sliders to be inserted into each guide part, and the driving link and the driven link may be interconnected to form one linkage, and a plurality of linkages may be mounted on the respective installation parts and sliders, respectively.

The plurality of linkages may be connected via a driving shaft connected to the driving link of each linkage, and a driver may be connected to the driving shaft and may transmit rotational power to the driving shaft.

The housing may have a front cover mounted on a front portion thereof, and the front cover may be formed to extend along the guide part so that the slider vertically slides together with the guide part when mounted on the housing.

The front cover may be formed with a covering portion bent rearward from a side end thereof, and the covering portion may be bent rearward and may extend so that the driving link and the driven link are not exposed and assembled to the housing.

The slider may be formed with a reinforcing rib, and the guide part may be formed with a support rib supported in contact with the reinforcing rib.

A rear cover formed to cover the driving link and the driven link may be mounted on a rear surface of the housing.

The active air skirt apparatus having the above-described structure can secure optimal aerodynamic performance by controlling the airflow flowing through a lower portion of the mobility device according to the traveling state of the mobility device. In addition, it is possible to improve durability and reliability by stably moving the flap for controlling the airflow even when the vehicle travels at high speed.

BRIEF DESCRIPTION OF THE FIGURES

The above and other objects, features and other advantages of the present disclosure will be clearly understood from the following detailed description when taken in conjunction with the accompanying drawings, in which.

DETAILED DESCRIPTION

Figure 1:
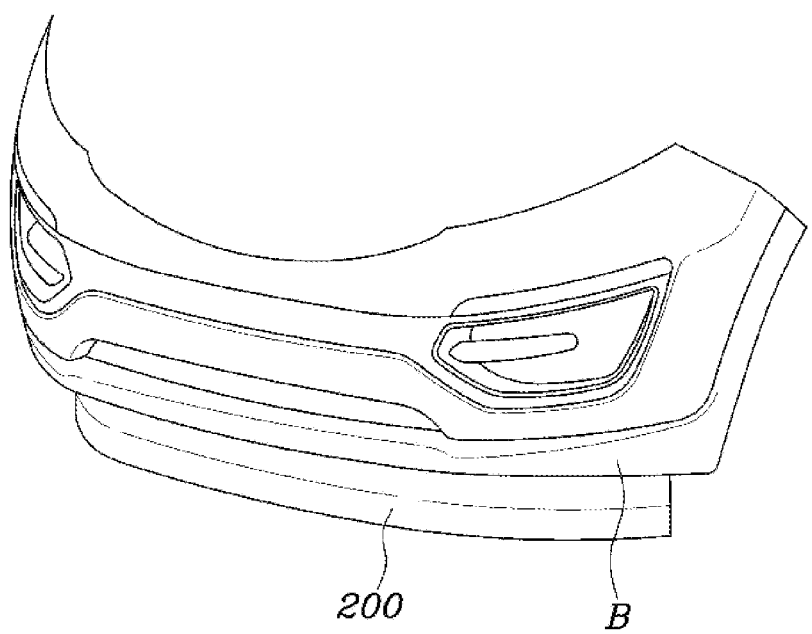
FIG. 1 is a view showing a front portion and flap of a mobility device.

Hereinafter, an embodiment disclosed in the present specification will be described in detail with reference to the accompanying drawings, and the same or similar components are given the same reference numerals regardless of reference numerals, and overlapping descriptions thereof will be omitted.

The suffixes "module" and "unit" for components used in the following description are given or used interchangeably in consideration of only the ease of preparing the specification, and do not have distinct meanings or roles by themselves.

In describing the embodiment disclosed in the present specification, when it is determined that detailed descriptions of related known technologies may obscure the gist of the embodiment disclosed in the present specification, detailed descriptions thereof will be omitted. In addition, it should be understood that the accompanying drawings are only for easy understanding of the embodiment disclosed in the present specification, and the technical spirit disclosed herein is not limited by the accompanying drawings, and includes all changes, equivalents, or substitutes included in the spirit and technical scope of the present disclosure.

Terms including ordinal numbers such as first and second may be used to describe various components, but the components are not limited by the terms. The terms are used only for the purpose of distinguishing one component from another.

When a certain component is described as being "connected" or "coupled" to another component, it should be understood that it may also be directly connected or coupled to another component, but other components may be present therebetween. On the other hand, it should be understood that when a certain component is described as being "directly connected" or "directly coupled" to another component, other components are not present therebetween.

The singular expression includes the plural expression unless the context clearly dictates otherwise.

In the specification, it should be understood that terms such as "comprises" or "have" are intended to specify that the features, numbers, steps, operations, components, parts, or combinations thereof described in the specification are present, but do not preclude the possibility of the presence or addition of one or more other features, numbers, steps, operations, components, parts, or combinations thereof.

A controller may include a communication device for performing communication with other controllers or sensors to control functions in charge, a memory for storing operating systems or logic commands and input/output information, and one or more processors for performing determination, calculation, and decision necessary for controlling the functions in charge.

Hereinafter, an active air skirt apparatus according to preferred embodiments of the present disclosure will be described with reference to the accompanying drawings.

Figure 2:
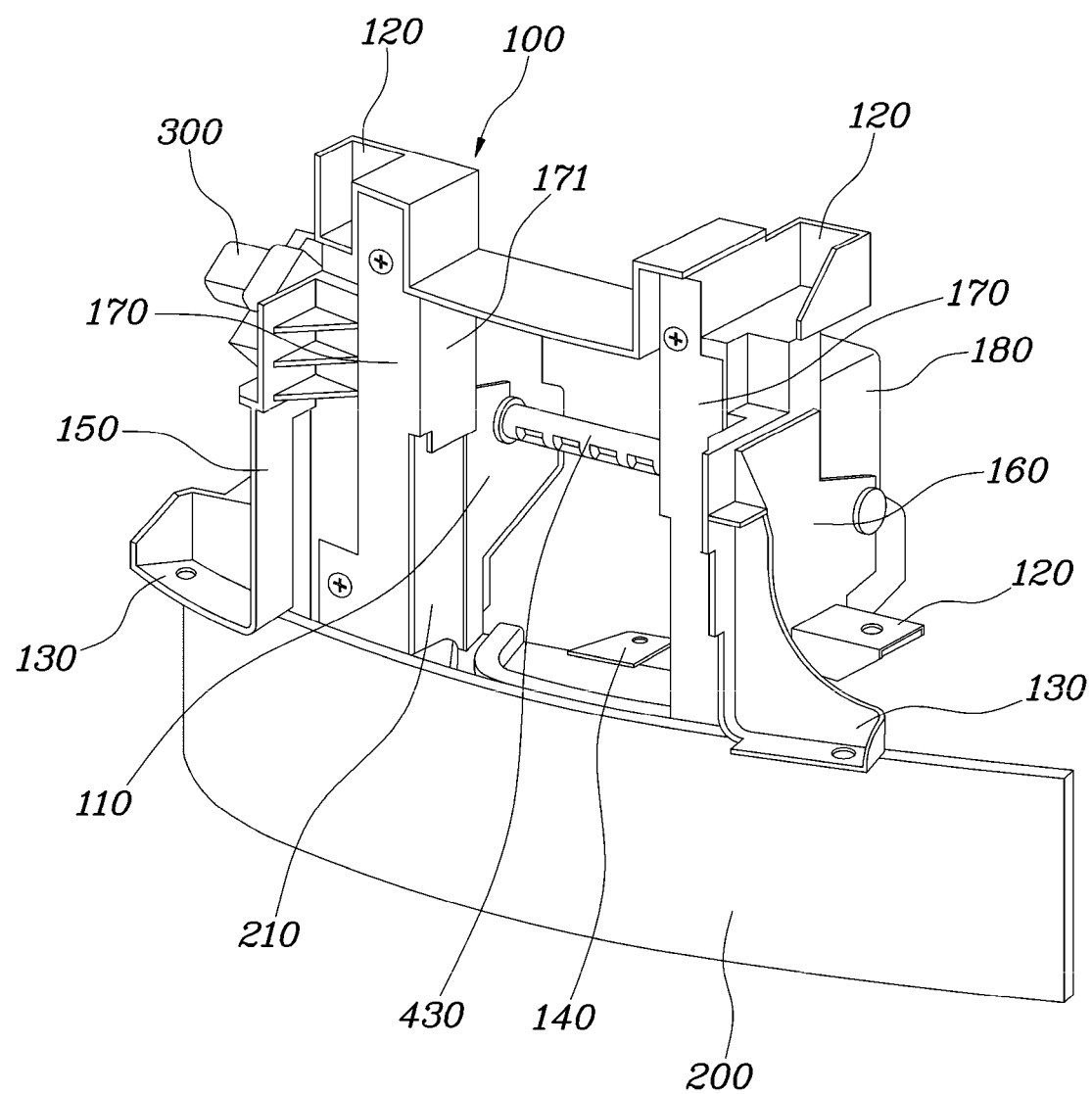
FIG. 2 is a view showing an active air skirt apparatus according to one embodiment of the present disclosure.
Figure 3:
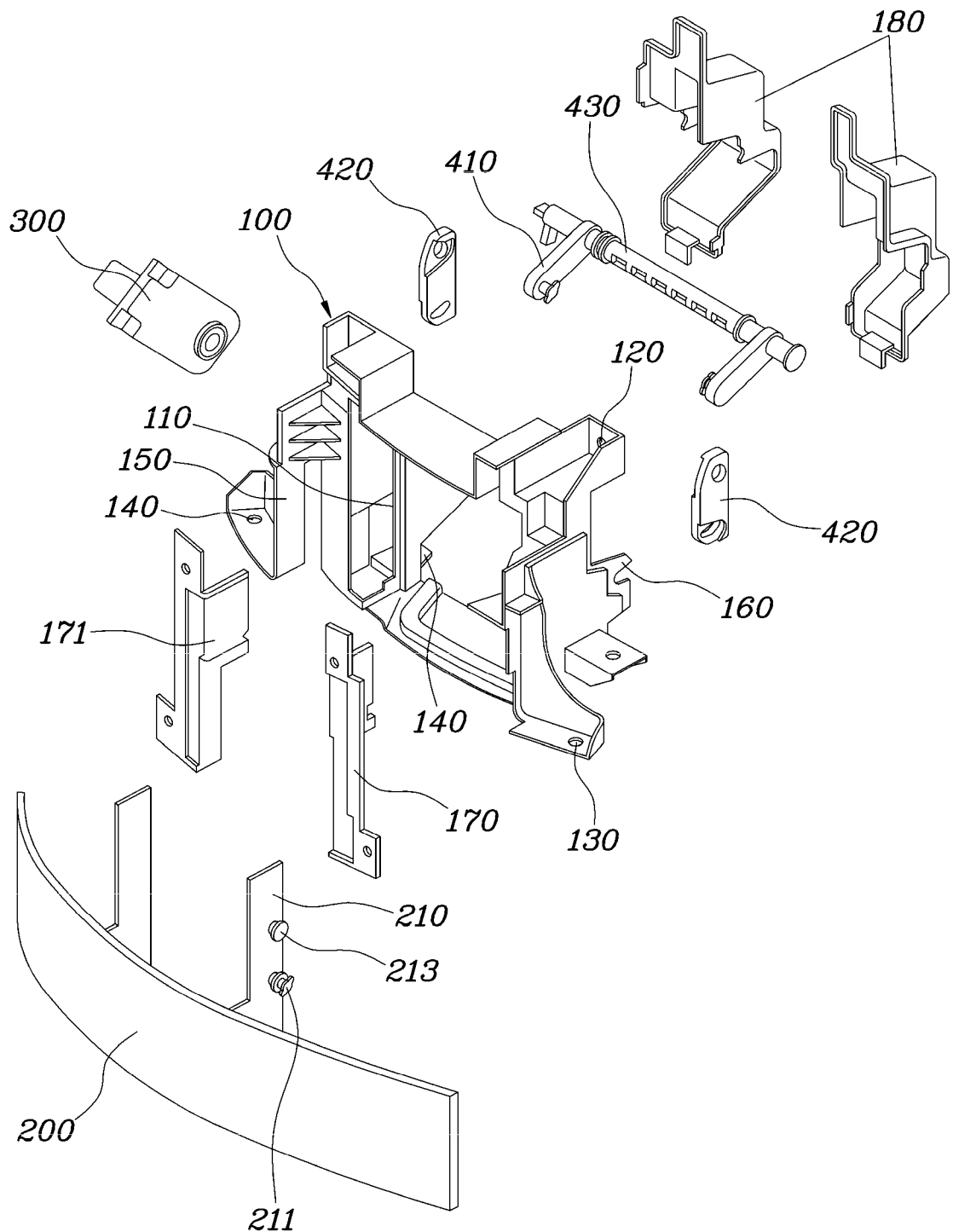
FIG. 3 is an assembly view of the active air skirt apparatus shown in FIG. 2.
Figure 4:
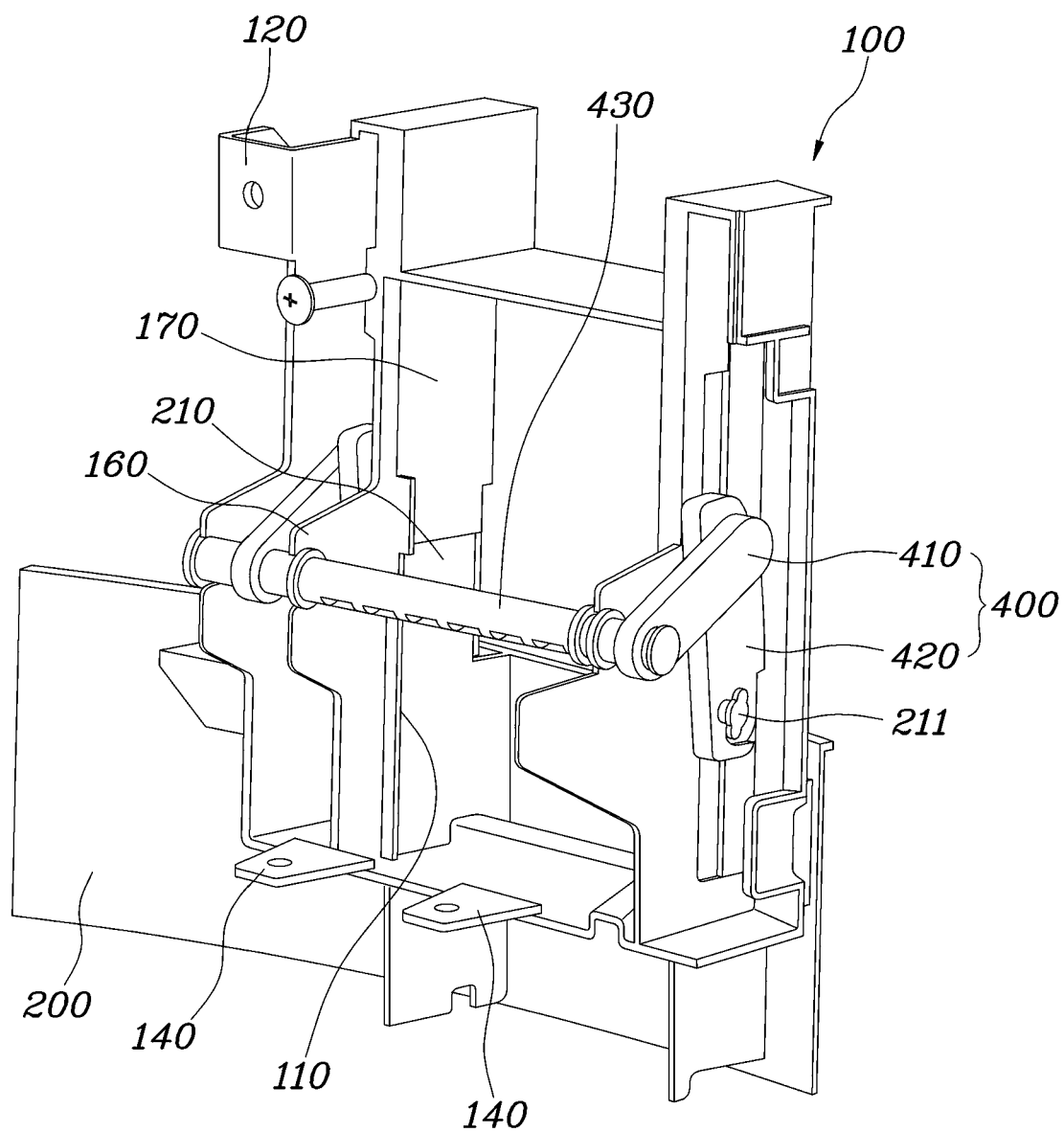
FIG. 4 is a rear view of the active air skirt apparatus shown in FIG. 2.
Figure 5:
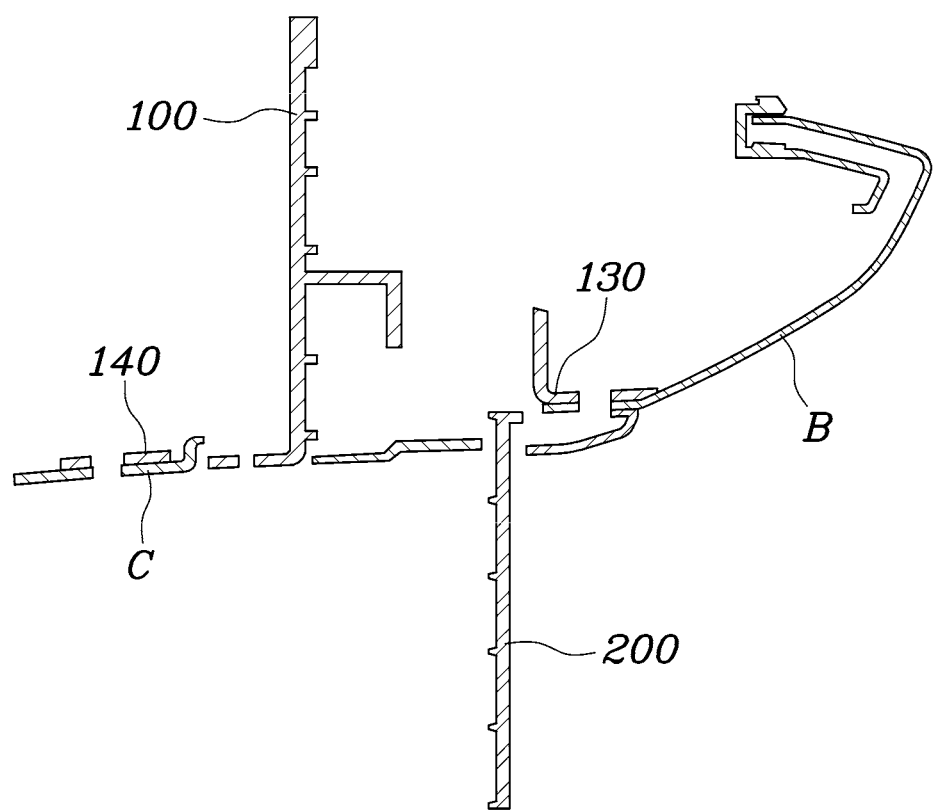
FIG. 5 is a view showing the mounting of a housing of the active air skirt apparatus shown in FIG. 2.
Figure 6:
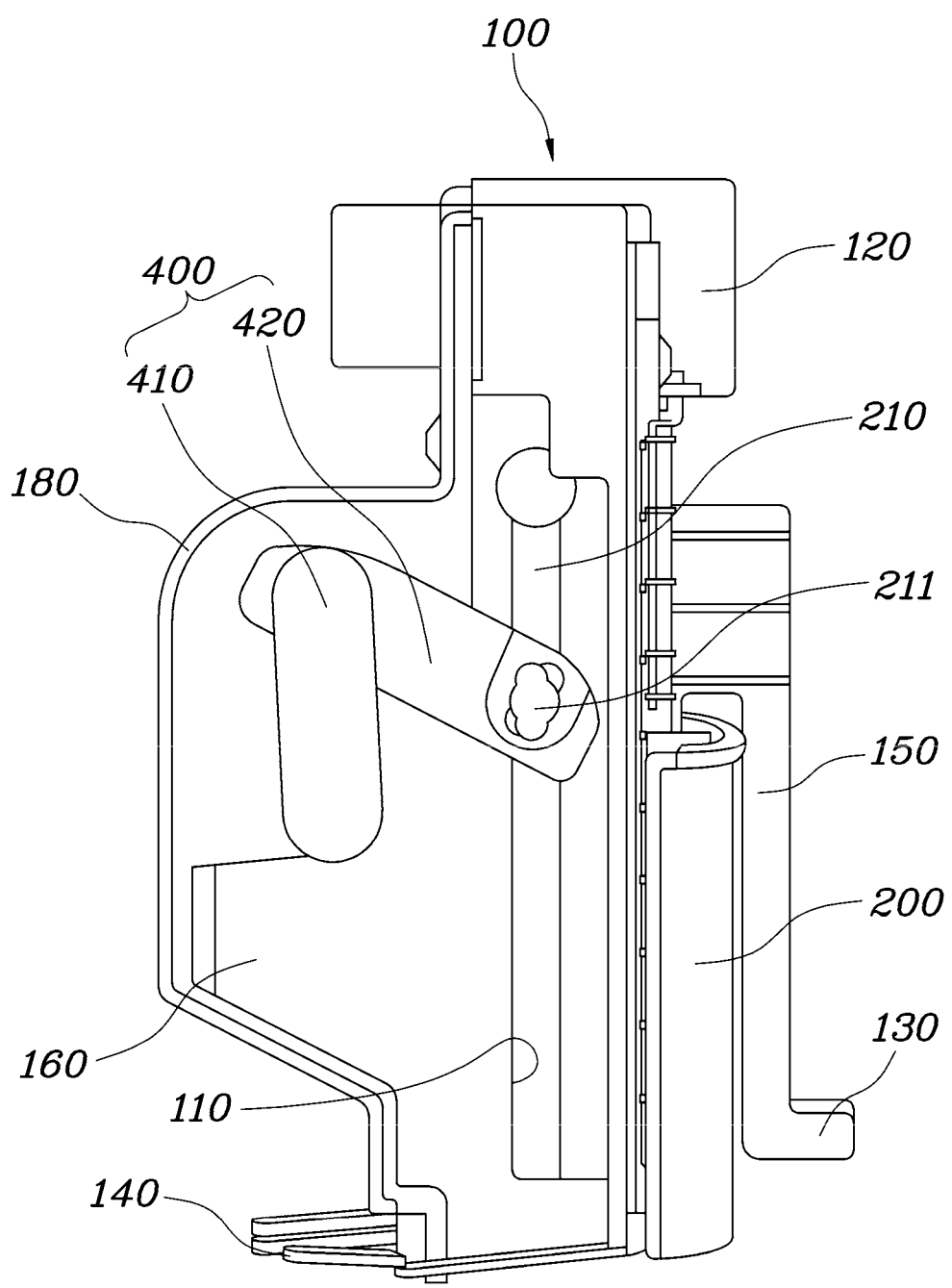
FIG. 6 is a side cross-sectional view of the active air skirt apparatus shown in FIG. 2.

FIG. 1 is a view showing a front portion and flap of a mobility device, FIG. 2 is a view showing an active air skirt apparatus according to one embodiment of the present disclosure, FIG. 3 is an assembly view of the active air skirt apparatus shown in FIG. 2, FIG. 4 is a rear view of the active air skirt apparatus shown in FIG. 2, FIG. 5 is a view showing the mounting of a housing of the active air skirt apparatus shown in FIG. 2, and FIG. 6 is a side cross-sectional view of the active air skirt apparatus shown in FIG. 2.

Figure 7:
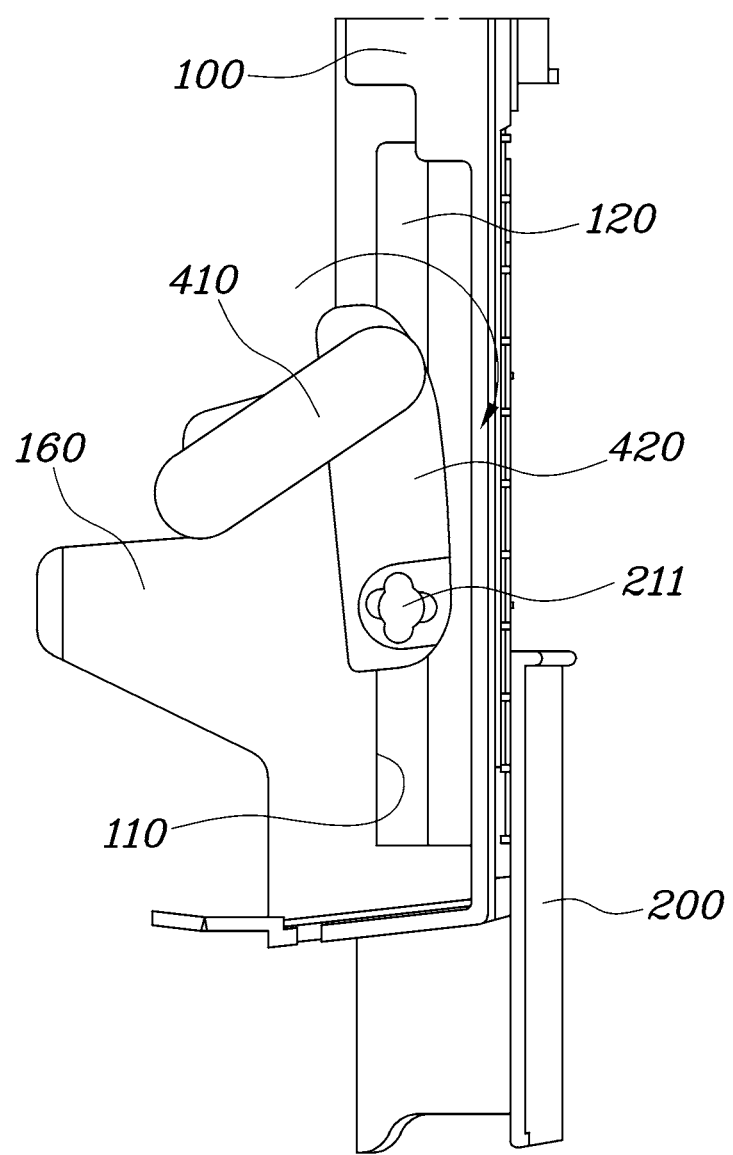
FIG. 7 is a view for describing an operating state of the active air skirt apparatus shown in FIG. 2.
Figure 8:
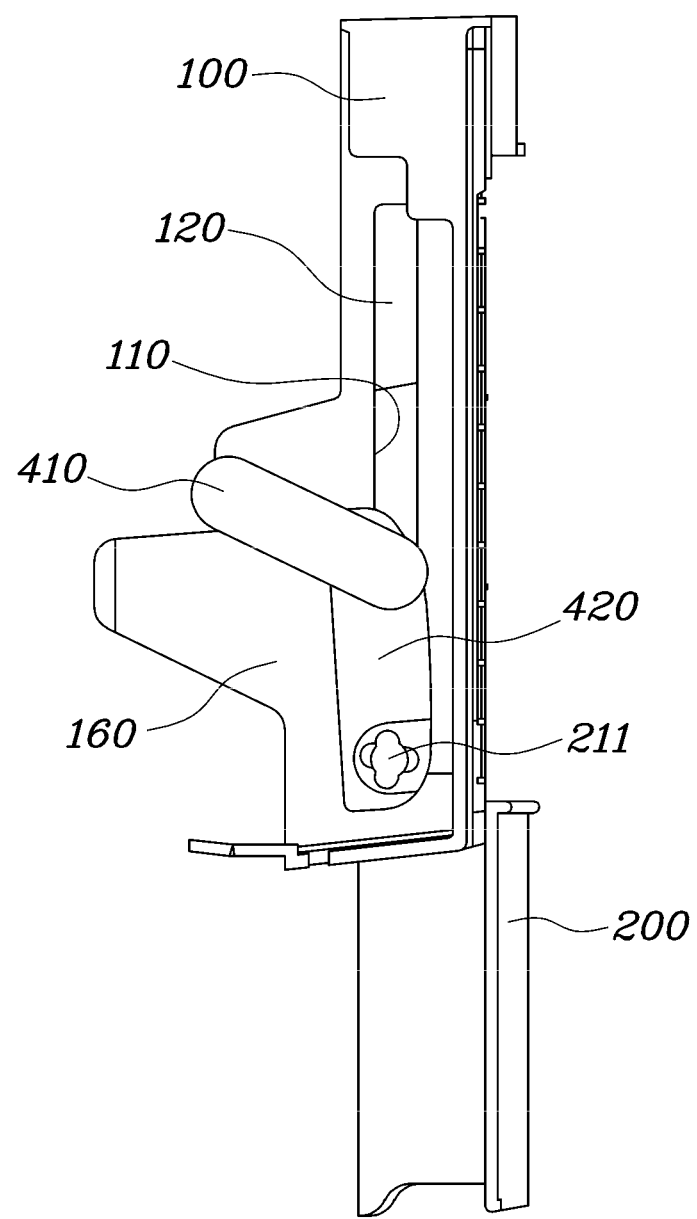
FIG. 8 is a view showing a state in which the flap of the active air skirt apparatus shown in FIG. 2 is deployed.

Meanwhile, FIG. 7 is a view for describing an operating state of the active air skirt apparatus shown in FIG. 2 and FIG. 8 is a view showing a state in which the flap of the active air skirt apparatus shown in FIG. 2 is deployed.

Figure 9:
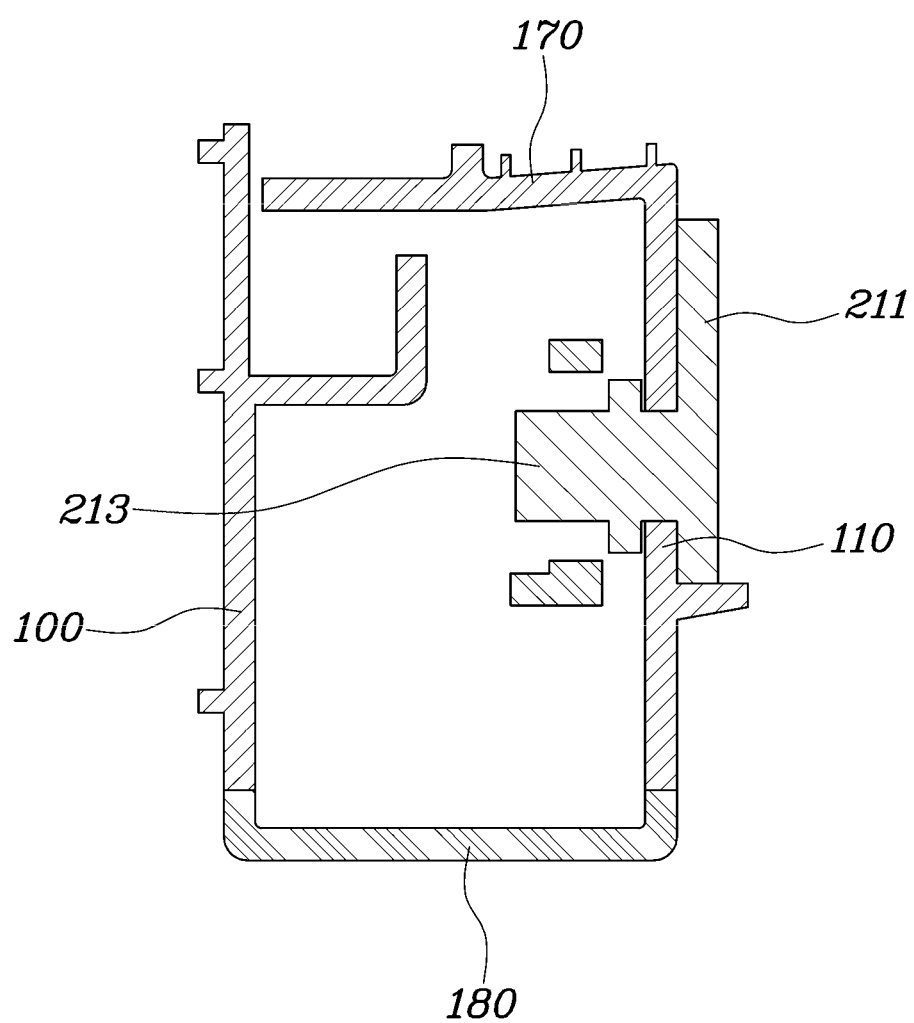
FIG. 9 is a view showing the mounting of a slider of the flap in the active air skirt apparatus shown in FIG. 2.
Figure 10:
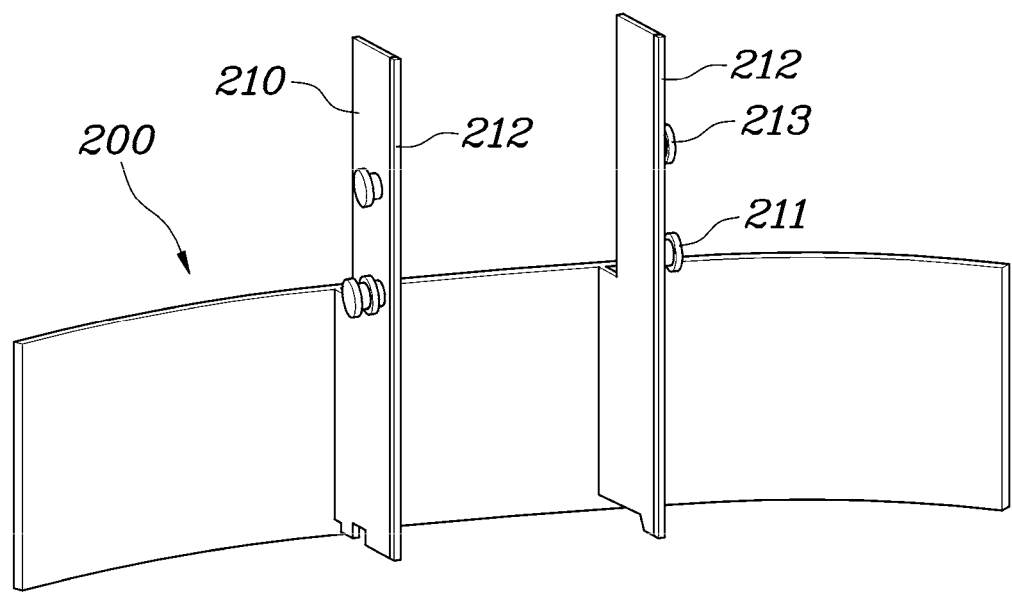
FIG. 10 is a view showing the flap in the active air skirt apparatus shown in FIG. 2.
Figure 11:
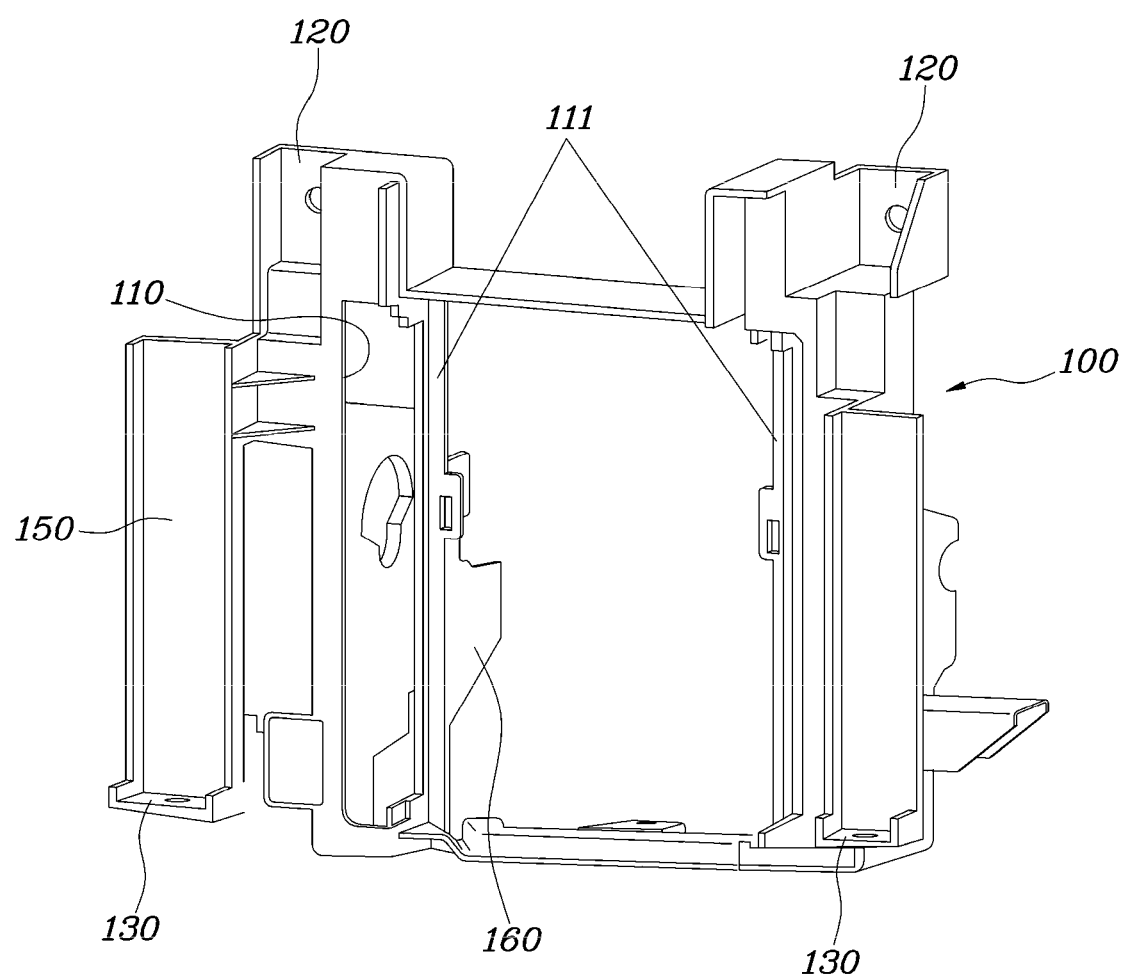
FIG. 11 is a view showing the housing in the active air skirt apparatus shown in FIG. 2.

FIG. 9 is a view showing the mounting of a slider of the flap in the active air skirt apparatus shown in FIG. 2, FIG. 10 is a view showing the flap in the active air skirt apparatus shown in FIG. 2, and FIG. 11 is a view showing the housing in the active air skirt apparatus shown in FIG. 2.

As shown in FIGS. 1 to 7, an active air skirt apparatus according to the present disclosure includes a housing 100 in which a guide part 110 is vertically formed, a flap 200 provided on the guide part 110 and vertically moving along the guide part 110, a driver 300 installed in the housing and for generating power, a driving link 410 rotatably installed in the housing 100, connected to the driver 300, and rotated downward upon operation of the driver 300 in a state of being positioned to face upward, and a driven link 420 rotatably connected to the flap 200, rotatably connected to the driving link 410, and rotated downward upon rotation of the driving link 410 in a state of being positioned to face forward to move to press the flap 200 down so that the flap 200 moves along the guide part 110.

According to the present disclosure, an airflow flowing through a lower portion of the mobility device is controlled to secure optimum aerodynamic performance.

To this end, the housing 100 may be installed on a lower portion of the mobility device, and the guide part 110 is formed in the housing 100 so that the flap 200 vertically moves along the guide part 110.

In other words, when the flap 200 is positioned at an upper side of the guide part 110 of the housing 100, the flap 200 is in a stored state, and when the flap 200 is positioned at a lower side of the guide part 110, the flap 200 is in a deployed state and reduces an airflow flowing to the lower side of the mobility device, thereby improving aerodynamic performance of the mobility device.

The flap 200 may be switched to a stored or deployed state in conjunction with the rotation of the driving link 410 and the driven link 420 depending on whether the driver 300 operates.

The driver 300 is installed in the housing 100 and generates rotational power depending on whether the driver 300 operates. The driver 300 may be operated by receiving a command from the controller, and the controller transmits a command according to the stored or deployed state according to the traveling environment and surrounding environment such as a traveling speed of the mobility device and a road surface condition in front of the mobility device to the driver 300.

As the driving link 410 is connected to the driver 300, the driven link 420 is connected to the driving link 410, and the flap 200 is connected to the driven link 420, the driving link 410 and the driven link 420 are linked when the rotational power of the driver 300 is generated and thus a position of the flap 200 may be adjusted.

In particular, the driving link 410 is positioned to face upward in the stored state, the driven link 420 is positioned to face forward from the driving link 410, and the driven link 420 is rotated with the driving link 410 when the flap 200 is switched to the deployed state by the operation of the driver 300, and since the driving link 410 has a form of pressing the driven link 420 down, the flap 200 connected to the driven link 420 moves downward.

Therefore, even when traveling wind acts on the flap 200 while the mobility device travels, the flap 200 stably moves toward a position to be deployed, thereby improving the operational reliability of the flap 200. In other words, the flap 200 for controlling the airflow stably moves even upon high-speed traveling, thereby improving durability and reliability.

Specifically describing the present disclosure described above, the housing 100 is installed on a vehicle body A on the lower portion of the mobility device, provided inside a bumper cover B, and adjusts the airflow flowing to the lower side of the mobility device as the flap 200 vertically moves.

As shown in FIG. 1, the flap 200 is deployed downward on a lower portion of the mobility device to control the airflow flowing through the lower portion of the mobility device. In addition, the housing 100 may be installed on the vehicle body A to maintain a firmly fixed state and is provided inside the bumper cover B so as not to be exposed to the outside.

The housing 100 is formed with an upper mounting part 120 mounted on the vehicle body A at an upper end thereof, a first lower mounting part 130 mounted on the bumper cover B on a front surface of a lower end thereof, and a second lower mounting part 140 mounted on an undercover C on a rear surface of the lower end thereof.

As shown in FIGS. 3 to 5, the housing 100 is formed with the upper mounting part 120, the first lower mounting part 130, and the second lower mounting part 140, the upper mounting part 120 may be fixedly bolting-fastened to the vehicle body A, the first lower mounting part 130 may be fixedly bolting-fastened to the bumper cover B, and the second lower mounting part 140 may be fixedly bolting-fastened to the undercover C.

Therefore, the housing 100 may maintain a firmly fixed state because it is fastened to each of the vehicle body A, the bumper cover B, and the undercover C on the lower portion of the mobility device. Additionally, a side portion of the housing 100 may also be configured to be fastened to one or more of the vehicle body A, the bumper cover B, and the undercover C.

Meanwhile, the housing 100 is formed with a support part 150 bent to surround the flap 200 so that the flap 200 may move only in the vertical direction in a state of being inserted into the support part 150.

As shown in FIG. 6, the support part 150 is formed on a front portion of the housing 100, and since the support part 150 has a form that is bent from the front surface of the housing 100 and extends downward therefrom, the flap 200 is inserted into the support part 150. Therefore, the movement of the flap 200 in a front-rear direction is limited in the state of being inserted into the support part 150, and since the movement thereof is allowed only in the vertical direction in which the support part 150 extends, the flap 200 linearly moves in the vertical direction.

Meanwhile, the guide part 110 is formed as a slit hole extending upward from the lower end of the housing 100, and the flap 200 is formed with a slider 210 inserted into the guide part 110 and vertically sliding along the guide part 110.

As shown in FIG. 3, the guide part 110 is formed to pass through the housing 100 and formed as the slit hole as it vertically extends.

In addition, the slider 210 extends upward from a rear surface of the flap 200, and the slider 210 is provided on the guide part 110 and vertically slides along the guide part 110. The slider 210 may be formed in the form of a panel having a certain area and configured to secure its own stiffness, and the driven link 420 may be rotatably installed on a surface of the slider 210.

Therefore, the flap 200 may move only in the vertical direction by inserting the slider 210 into the guide part 110 of the housing 100 and inserting a body part into the support part 150, thereby maintaining a firm support state.

Meanwhile, a connection structure of the driving link 410 and the driven link 420 according to the present disclosure is as follows.

As shown in FIG. 6, an installation part 160 is formed behind the guide part 110 in the housing 100 so that one end of the driving link 410 is rotatably mounted on the installation part 160, the slider 210 is formed with a hinge part 211 so that one end of the driven link 420 is rotatably mounted on the hinge part 211, and the other end of the driving link 410 and the other end of the driven link 420 are rotatably connected.

In other words, since the installation part 160 extends backward from the housing 100, the driving link 410 and the driven link 420 may be positioned behind the flap 200. Therefore, when the driving link 410 rotates forward, the driving link 410 may be operated in the form of pressing the flap 200 down as the driven link 420 moves forward while rotating downward.

As the hinge part 211 is formed on the slider 210 of the flap 200, the driven link 420 is rotatably mounted via the hinge part 211.

As described above, in a state in which one end of the driving link 410 is rotatably provided on the installation part 160 of the housing 100 and one end of the driven link 420 is rotatably connected to the hinge part 211 of the flap 200, the other end of the driving link 410 and the other end of the driven link 420 are rotatably hinge-connected, and thus the driven link 420 may be rotated by the rotation of the driving link 410 when the driver 300 is operated to move the flap 200.

In particular, the driving link 410 and the driven link 420 are positioned behind the flap 200, and as the driving link 410 has the form of pressing the driven link 420 down while rotated forward when the driver 300 is operated, the flap 200 connected to the driven link 420 may move down with a strong force.

In other words, as shown in FIG. 6, in the state in which the flap 200 is stored, the driving link 410 is positioned to face upward and the driven link 420 is positioned to face forward from the driving link 410. Here, as shown in FIGS. 7 and 8, when the flap 200 switches to the deployed state by the operation of the driver 300, as the driven link 420 moves and rotates forward while the driving link 410 rotates forward and downward, the driven link 420 presses the flap 200 down. Therefore, the flap 200 moves down from the housing 100 with a strong force, and thus may be stably deployed even when traveling wind acts.

Meanwhile, the housing 100 may include a plurality of guide parts 110 and installation parts 160, and the flap 200 may include a plurality of sliders 210 to be inserted into each guide part 110.

In one embodiment of the present disclosure, a pair of the guide part 110 and the installation part 160 are configured, and a pair of the slider 210 of the flap 200 is configured to be inserted into each guide part 110. Therefore, the flap 200 has the plurality of sliders 210 inserted into each guide part 110 of the housing 100, and thus can maintain a balanced mounting state and can be firmly supported.

Here, the driving link 410 and the driven link 420 are interconnected to form one linkage 400, and a plurality of linkages 400 are mounted on the respective installation parts 160 and the sliders 210, respectively.

Therefore, the linkage 400 is installed on the housing 100 and the flap 200, and installed on the pair of the installation parts 160 provided in the housing 100 and the pair of sliders 210 provided on the flap 200, respectively, and thus the flap 200 may move up and down in a balanced manner and maintain the state of being firmly mounted on the pair of the linkages 400.

The pair of the linkages 400 for moving the flap 200 are not provided but the number of flaps 200 in design may be set depending on the stiffness required for the flap 200.

Meanwhile, the plurality of linkages 400 are connected via a driving shaft 430 connected to the driving link 410 of each linkage 400, and the driver 300 is connected to the driving shaft 430 and transmits rotational power to the driving shaft 430.

In other words, in the present disclosure, the flap 200 is connected to the plurality of linkages 400, and the plurality of linkages 400 are connected to one driving shaft 430 and simultaneously rotated. Here, the driving shaft 430 is connected to the driver 300 so that the driving shaft 430 is rotated when the driver 300 is operated and the plurality of linkages 400 connected to the driving shaft 430 are linked and simultaneously rotated.

As described above, the plurality of linkages 400 are connected to one driving shaft 430 connected to one driver 300 and rotated, and thus the structure can be simplified and the plurality of linkages 400 can be integrated and simultaneously operated.

Meanwhile, as shown in FIGS. 3 and 9, the housing 100 has a front cover 170 mounted on the front portion thereof, and the front cover 170 is formed to extend along the guide part 110 so that the slider 210 vertically slides together with the guide part 110 when the front cover 170 is mounted in the housing 100.

The front cover 170 is formed with a covering portion 171 bent rearward from a side end thereof and connected to the housing 100 as the covering portion 171 is bent rearward and extends.

The front cover 170 is mounted on the front portion of the housing 100 and blocks the permeation of foreign substances generated from the front side so that the driving link 410 and the driven link 420 are not contaminated when the front cover 170 is mounted on the housing 100. The front cover 170 may be formed to extend along the guide part 110 and formed to cover the front portion of the housing 100 when mounted on the housing 100.

In addition, the front cover 170 is formed with the covering portion 171, and as the covering portion 171 is bent from the housing 100 and assembled to the housing 100, the front cover 170 is firmly assembled to the housing 100. In addition, as the driving link 410 and the driven link 420 are not exposed to the outside of the housing 100 by the covering portion 171, the driving link 410 and the driven link 420 are prevented from being contaminated by foreign substances.

In particular, the guide part 110 is formed to be opened from the housing 100, and the front cover 170 is in contact with the slider 210 of the flap 200 provided on the guide part 110 when mounted on the housing 100, and thus the slider 210 may be configured to move vertically between the front cover 170 and the guide part 110. Therefore, as shown in FIG. 9, the slider 210 may be formed with a separate guider 213, and the guider 213 may be provided between the guide part 110 of the housing 100 and the front cover 170. In addition, when the front cover 170 is mounted on the housing 100, the slider 210 of the flap 200 is mounted on the guide part 110, thereby securing assembly convenience.

Meanwhile, as shown in FIGS. 10 and 11, the slider 210 may be formed with a reinforcing rib 212, and the guide part 110 may be formed with a support rib 111 supported in contact with the reinforcing rib 212.

Therefore, the stiffness of the slider 210 is reinforced by the reinforcing ribs 212, and as the support rib 111 is formed on the guide part 110, the stiffness of a contact portion of the slider 210 may be reinforced and the slider 210 of the flap 200 may smoothly move in the vertical direction in a state in which the support rib 111 and the reinforcing rib 212 are in contact with each other.

Meanwhile, a rear cover 180 formed to cover the driving link 410 and the driven link 420 may be mounted on the rear portion of the housing 100.

As described above, the rear cover 180 is mounted on the rear portion of the housing 100, and when mounted on the housing 100, blocks the permeation of foreign substances generated from the rear side so that the driving link 410 and the driven link 420 are not contaminated.

In addition, the installation part 160 of the housing 100 is formed so that the driving shaft 430 is seated, and when the rear cover 180 is assembled in a state in which the driving shaft 430 is seated on the installation part 160, the driving shaft 430 may be configured to be supported in a rotatable state. Therefore, it is possible to improve assembly convenience of the driving shaft 430 and the rear cover 180.

The active air skirt apparatus having the above-described structure can secure optimal aerodynamic performance by controlling the airflow flowing through the lower portion of the mobility device according to the traveling state of the mobility device. In addition, the flap 200 for controlling the airflow can stably move even when the vehicle travels at high speed, thereby improving durability and reliability.

Although the present disclosure has been shown and described with reference to specific embodiments, it will be obvious to those skilled in the art that the present disclosure may be variously improved and changed without departing from the technical spirit of the present disclosure provided by the appended claims.

The invention claimed is:

1. An active air skirt apparatus, comprising:
a housing;
a guide part mounted vertically on the housing;
a flap positioned on the guide part and configured to move vertically along the guide part;
a driver positioned in the housing and configured to generate power;
a driving link rotatably installed in the housing, connected to the driver, and configured to rotate downward upon operation of the driver when the driving link faces upward; and
a driven link rotatably connected to the flap, rotatably connected to the driving link, and configured to press the flap down when rotated downward upon rotation of the driving link when the driven link faces forward so the flap moves along the guide part.

2. The active air skirt apparatus of claim 1, wherein the housing is positioned on a vehicle body on a lower portion of a mobility device, positioned inside a bumper cover, and configured to adjust an airflow flowing to a lower side of the mobility device as the flap moves vertically.

3. The active air skirt apparatus of claim 1, wherein the housing includes an upper mounting part mounted on a vehicle body on an upper end, a first lower mounting part mounted on a bumper cover on a front surface of a lower end, and a second lower mounting part mounted on an undercover on a rear surface of the lower end.

4. The active air skirt apparatus of claim 1, wherein the housing includes a support part bent to surround the flap, wherein the support part moves only in a vertical direction when the flap is inserted into the support part.

5. The active air skirt apparatus of claim 1, wherein the guide part comprises a slit hole extending upward from a lower end of the housing, and
the flap includes a slider inserted into the guide part and configured to slide vertically along the guide part.

6. The active air skirt apparatus of claim 5, wherein the housing includes an installation part positioned behind the guide part, and one end of the driving link is rotatably mounted on the installation part, wherein the slider includes a hinge part and one end of the driven link is rotatably mounted on the hinge part, and
wherein an other end of the driving link and an other end of the driven link are rotatably connected.

7. The active air skirt apparatus of claim 6, wherein the housing includes a plurality of guide parts and a plurality of installation parts,
wherein the flap includes a plurality of sliders configured to be inserted into each of the plurality of guide parts, and
wherein the driving link and the driven link are interconnected to form one linkage, and a plurality of linkages are mounted on each of the plurality of installation parts and the plurality of sliders.

8. The active air skirt apparatus of claim 7, wherein the plurality of linkages are connected via a driving shaft connected to the driving link of each of the plurality of linkages, and the driver is connected to the driving shaft and configured to transmit rotational power to the driving shaft.

9. The active air skirt apparatus of claim 5, wherein the housing has a front cover mounted on a front portion, and
the front cover extends along the guide part so the slider vertically slides together with the guide part when mounted on the housing.

10. The active air skirt apparatus of claim 9, wherein the front cover includes covering portion bent rearward from a side end of the front cover, and the covering portion is bent rearward and extends so the driving link and the driven link are not exposed, and assembled to the housing.

11. The active air skirt apparatus of claim 5, wherein the slider includes a reinforcing rib, and the guide part includes a support rib in contact with the reinforcing rib.

12. The active air skirt apparatus of claim 1, further comprising a rear cover mounted on a rear surface of the housing, wherein the rear cover is configured to cover the driving link and the driven link.

* * * * *